United States Patent
Deckoff

(10) Patent No.: US 8,429,060 B2
(45) Date of Patent: *Apr. 23, 2013

(54) HEDGING RISK IN AN INVESTMENT VEHICLE

(75) Inventor: Stephen H. Deckoff, Bedford, NY (US)

(73) Assignee: Black Diamond Capital Management, L.L.C., Greenwich, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/804,845

(22) Filed: Jul. 29, 2010

(65) Prior Publication Data

US 2011/0071957 A1 Mar. 24, 2011

Related U.S. Application Data

(63) Continuation of application No. 11/368,241, filed on Mar. 3, 2006, now Pat. No. 7,769,670.

(51) Int. Cl.
*G06Q 40/04* (2012.01)

(52) U.S. Cl.
USPC .................................. 705/37; 705/35; 705/39

(58) Field of Classification Search .................... 705/35, 705/37, 39
See application file for complete search history.

(56) References Cited

U.S. PATENT DOCUMENTS

| | | | |
|---|---|---|---|
| 6,460,021 B1 * | 10/2002 | Kirksey | 705/35 |
| 7,324,967 B1 * | 1/2008 | Sankaran et al. | 705/37 |
| 7,346,572 B2 * | 3/2008 | Hoffman | 705/37 |
| 2003/0018563 A1 * | 1/2003 | Kilgour et al. | 705/37 |
| 2003/0208431 A1 * | 11/2003 | Raynes et al. | 705/36 |
| 2004/0153375 A1 | 8/2004 | Mukunya et al. | 705/26 |
| 2004/0158520 A1 | 8/2004 | Noh | 705/38 |
| 2005/0137957 A1 * | 6/2005 | McDaniel, Jr. | 705/37 |
| 2007/0271167 A1 * | 11/2007 | Gula, IV | 705/36 R |
| 2008/0097895 A1 * | 4/2008 | Sankaran et al. | 705/37 |

OTHER PUBLICATIONS

Written Opinion of ISA, Reasoned Statement with regard to novelty, inventive step or industrial applicability, 2 pages.

* cited by examiner

*Primary Examiner* — Jagdish Patel
(74) *Attorney, Agent, or Firm* — Donna L. Angotti; The Law Offices of Donna L. Angotti

(57) ABSTRACT

A method for managing an investment vehicle. An option is purchased for protection of cash flows to be paid by the investment vehicle to designated investors. An option is sold offsetting the purchased option at least in part. The cash flows and security priorities of the investment vehicle are structured so that the purchased option protects the protected investors, and the proceeds of the sale of the sold option offsets the cost of the purchased option for benefit of non-protected investors.

36 Claims, 1 Drawing Sheet

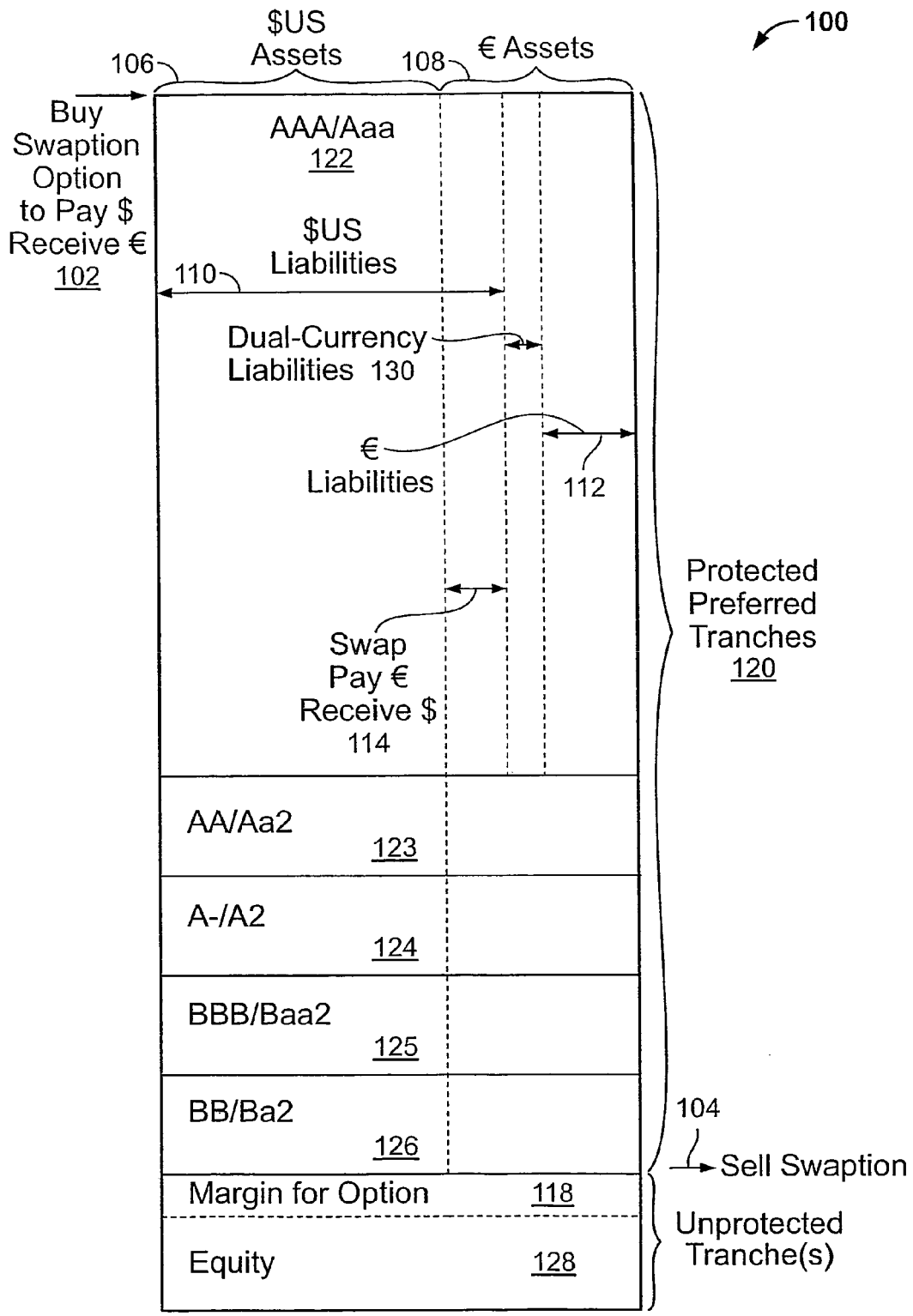

HEDGING RISK IN AN INVESTMENT VEHICLE

This application is a continuation of U.S. application Ser. No. 11/368,241 filed Mar. 3, 2006, now U.S. Pat. No. 7,769,670 which is incorporated herein by reference in its entirety.

BACKGROUND

This invention relates to investment finance.

Options trade on a variety of instruments and commodities. Typically, a "call" option gives the option holder the right to buy a given quantity of a given security or commodity to the option's counterparty at an established price. A "put" option gives the option holder the right to sell a given quantity of a given security to the counterparty at an established price. In an "American option," the option may be exercised any time up to the expiration date. In a "European option," the option may be exercised only on the expiration date.

"Swaps" are contracts to exchange one set of cash flows for another, or a contracted-for quantity of one security or commodity for a contracted-for quantity of another on a date certain in the future. For example, a "currency swap" is an agreement to pay x amount of one currency to receive y amount of another currency on an agreed date.

A "swaption" is an option to enter a swap. For example, a "currency swaption" is a contract that permits the option holder to demand a swap to pay x quantity of one currency and receive y quantity of another.

These are not formal definitions; rather they are only general explanations of specific cases of contracts that may be applied in a range of circumstances.

SUMMARY

In general, in a first aspect, the invention features a method. An option is purchased for protection of cash flows to be paid by an investment vehicle to designated investors. An option is sold offsetting the purchased option at least in part. The cash flows and security priorities of the investment vehicle are structured so that the purchased option protects the protected investors, and the proceeds of the sale of the sold option offsets the cost of the purchased option for benefit of non-protected investors.

In general, in a second aspect, the invention features a method performed by an investor in an investment vehicle. The investor invests in the vehicle. The vehicle has purchased, or purchases in response to the investment, an option to protect against certain risks of assets owned by the vehicle. The vehicle has sold, or sells in response to the purchase of the option, an option corresponding to the purchased option and offsetting the purchased option at least in part. Cash flows and security priorities of the vehicle are arranged to protect designated protected investors, and the proceeds of the sale of the sold option are arranged to offset the cost of the purchased option for benefit of non-protected investors. The investor receives a cash flow from the investment vehicle.

In general, in a third aspect, the invention features a computer for assisting in management of an investment vehicle. The computer has (a) program code and/or data structures recording the purchased option to protect against certain risks of assets owned by the vehicle, (b) program code and/or data structures recording the sale of an option corresponding to the purchased option and offsetting the purchased option at least in part, (c) program code and/or data structures designed to control cash flows and security priorities of the investment vehicle to protect designated protected investors from risks covered by the purchased option, and to account the proceeds of the sale of the sold option to offset the cost of the purchased option for benefit of non-protected investors.

Embodiments of the invention may include one or more of the following features. The investment vehicle may be a cross-currency investment vehicle. The vehicle may invest in fixed-income instruments, including bonds and loans, investment grade or not investment grade. The vehicle may purchase a currency swap or interest rate swap having size and term to match cash flows generated by assets in the investment vehicle to cash flows to be paid by the vehicle to investors. The options may be currency swaptions, interest rate swaptions, or other options, having size and term to hedge various risks, including default risk and/or prepayment risk, on the investment vehicle's underlying assets. Some of redemption liabilities of the investment vehicle may be payable in two or more currencies. The non-protected investors may be equity or income note holders. The purchased option may be a basket of a plurality of options. The options in the basket may have exercise dates corresponding to redemption liabilities of the investment vehicle.

The above advantages and features are of representative embodiments only, and are presented only to assist in understanding the invention. It should be understood that they are not to be considered limitations on the invention as defined by the claims. Additional features and advantages of embodiments of the invention will become apparent in the following description, from the drawings, and from the claims.

DESCRIPTION OF THE DRAWINGS

FIG. 1 diagrams an investment vehicle.

DESCRIPTION

I. Overview

Referring to FIG. 1, an investment vehicle 100 may have preferred investors having protected preferred tranches 120 and subordinated investors having unprotected tranches 128. Investment vehicle 100 may invest in a portfolio 106, 108 of assets that generate a return. The returns may be paid in a waterfall arrangement to investors having tranches 120, 128, in order of priority. Option 102 may be purchased to hedge risks of the assets 106, 108 for protection of the preferred class of investors having tranches 120. For example, if vehicle 100 is a stock fund, the fund may purchase a put option such as option 102 to protect against a fall in the value of assets 106, 108, so that in the event of such a fall, option 102 may be exercised, and the proceeds of the exercise may flow through the waterfall to preferred investors having tranches 120. To reduce the cost of the hedge, second option 104, of same or similar characteristics as first option 102, may be sold to the capital markets. To maintain the protection of option 102 for the benefit of preferred investors having tranches 120, option 104 may be sold at a point in the waterfall below the preferred investors having tranches 120 and above subordinated investors having unprotected tranche like tranche 128, so that the preferred investors having tranches 120 remain protected, but subordinated investors having tranches 128 are not. In the example of the stock fund, the stock fund may sell a put option 104 having the same strike price and quantity as put option 102, or perhaps somewhat lower strike price and/or quantity. If options 102 and 104 are the same, then the sale proceeds of option 104 will be the same as the purchase cost of option 102. If they are different, the proceeds of option 104 may be somewhat less than the cost of option 102. In either event, because the cost of option 102 is exactly or nearly offset by the proceeds of option 104, the protection provided by first option 102 for priority investors with tranches 120 may cost very little for subordinated investors having tranches like tranche 128.

The structure may permit improved returns to investors while maintaining a desired rating from ratings agencies, and may permit a larger investment vehicle with improved diversification, which may in turn allow the costs of forming and managing the investment vehicle to be amortized over a larger pool.

II. Example

A Cross-Currency Vehicle

In one example, the investment vehicle 100 may be a cross-currency fund, a vehicle that invests in instruments denominated in more than one currency. Similarly, the fund may accept investments from investors in more than one currency. Unless the currencies of the investments exactly matches the currencies of the assets, some currency risk may arise, and may be hedged using options 102, 104. In an example, a $1 billion fund 100 may invest in a portfolio of $700 million of assets 106 denominated in United States dollars (USD or $US) and €240 million≈$US 300 million of assets 108 denominated in euros (EUR or €). The investment vehicle may have $875 million of redemption liabilities 110 to investors denominated in USD, and €100 million≈$US 125 million of redemption liabilities 112 denominated in EUR. In order to hedge the $175 million difference in the currency of the fund's assets and liabilities against currency risk, the fund may purchase up to $175 million in currency swaps 114, to pay EUR and receive $US at a fixed exchange rate, so that dollars will be available on the expected dates of redemption by investors. Typically the term of the swap contract or contracts will be commensurate with the redemption dates of the liabilities 110, 112.

To obtain a rating from one of the rating agencies (such as Standard & Poor's, Moody's Investors Service, and Fitch Ratings Inc.) for notes issued by the fund, the rating agency may require that fund 100 hedge out some portion of the risk of the asset pool, for example prepayment risk (the risk that the issuers of some portion of the assets of the portfolio may prepay the assets at a time when currency exchange rates are unfavorable to the fund) or default risk (that some issuers may pay untimely or not pay at all). To protect against that risk, the rating agency may require that the fund purchase currency swaptions such as option 102 contra to currency swaps 114, that is, an option that when exercised requires the counter-party to execute a pay dollars to receive euros transaction, opposite the pay euros to receive dollars currency swaps 114. In the example, the rating agency may require the fund to purchase an option 102 such as a swaption to pay U.S. dollars to receive euros, at any date up to the settlement date of the pay euros to receive dollars swap 114. The premium for an option 102 such as a swaption may be about 65 basis points annually.

The total notional value of options 102 (swaptions) may generally be somewhat lower than the notional value of swaps 114, and may be optimized as follows. As options 102 (swaptions) are increased to the value to the notional value of swap 114, the prepayment risk of the asset portfolio is more perfectly hedged, and the amount of equity in the equity tranches 128 may be reduced. As the notional value of options 102 (swaptions) is decreased, the cost of the option premium goes down, but equity reserve of equity tranches 128 that must be held as an alternative guarantee for the preferred tranches 120 goes up, and thus the return on investment for equity investors of tranches 128 goes down. The value of options 102 (swaptions) may be chosen to balance these concerns, to minimize the overall cost and maximize the total return of structure 100 and return on equity for equity investors having tranches 128.

In cases where the risk covered by option 102 (swaption) is sufficiently remote, the fund or its investors may determine that at least some tranches of the fund, for example equity slice or tranche 128 and possibly one or more low-priority fixed income tranches (not shown), do not require the protection of options 102 (swaptions). In such cases, the fund may sell options 104 (swaptions) that are the mirror image of options 102 (swaptions) (opposite currency pair, same or similar date, same or similar strike price), of the same or somewhat lower notional value. The premium received on sale of options 104 (swaptions) offsets the premium paid to purchase options 102 (swaptions). Because the two option premiums 102, 104 (swaptions) offset each other, the cost to equity investors having tranches 128 of protecting the higher-tranche 120 investors may be relatively low. The prepayment risk that was hedged away by options 102 (swaptions) is then borne by any investors below the attachment point of the sold option 104 (swaption) in the payment waterfall, for example, equity investors having tranches 128.

The counterparty to the sold options 104 (swaptions) will likely require some margin 118 to be posted by equity slice or tranche 128 of investment vehicle 100. As currency exchange rates move, the required margin 118 may increase or decrease. However, the probability of certain classes of risk, such as a catastrophic rate of prepayments, may be sufficiently remote, and the cost of posting margin 118 may be sufficiently low, that the option 104 premium is worth more than the protection against this risk.

Equity slice or tranche 128 may be conventional equity. In some cases, there may be tax advantages to structuring "equity" slice or tranche 128 as "income notes" that have the cash flow attributes of equity (that is, they receive any excess cash flow after the lowest fixed income tranche is paid, and bear the risk of any shortfall), but that lack other incidents of ownership under corporate law.

To consider another example, a $1 billion vehicle may invest in $687 million in U.S. denominated assets, and €250 million ($313 million) of euro-denominated assets. The equity tranche is structured as income notes. The vehicle may sell notes as follows:

| | Liabilities | |
|---|---|---|
| | Class | Face Amount |
| 122/110* | USD Aaa | $573,000,000.00 |
| 122/112* | EURO Aaa | €100,000,000.00 ≈ $80,000,000 |
| 123 | AA/Aa2 | $75,000,000.00 |
| 124 | A-/A2 | $70,000,000.00 |
| 125 | BBB/Baa2 | $67,000,000.00 |
| 126 | BB/Ba2 | $35,000,000.00 |
| 128 | Equity/Income Notes | $85,000,000.00 |

*Line items 122/110 and 122/112 represent, respectively, the USD portion 110 and Euro portion 112 of the AAA/Aaa tranche 122.

If the portfolio earns 6.8%, the quarterly interest income of the $1 billion portfolio will be $17 million. This $17 million may be paid out as follows:

| | |
|---|---:|
| Taxes | $ 0.00 |
| Fees and expenses of Trustee and Manager | $ 136,500.00 |
| Net payment on Swap | $ 10,000.00 |
| Pay fees for buying swaption protection | $ 243,750.00 |
| Senior Fees of Collateral Manager | $ 375,000.00 |
| AAA Interest and Principal | $8,000,000.00 |
| AA Interest and Principal | $ 820,000.00 |
| A Interest and Principal | $ 825,000.00 |
| BBB Interest and Principal | $1,000,000.00 |
| BB Interest and Principal | $ 790,000.00 |
| Income from sale of swaption | ($ 243,750.00) |
| Subordinated Management Fee and other expenses | $ 937,500.00 |
| Balance to Equity | $3,872,250.00 |

Because the U.S. market has the largest number of different issuers of high-quality securities, to attain ratable levels of diversification, as a practical matter any large investment pool must include some fraction of assets denominated in USD. Investment vehicles denominated in other currencies, for example euros, have been confined to smaller sizes, lower diversification, or higher equity slices, or have been unable to get a rating from a rating agency. An investment vehicle using an offsetting option 102, 104 hedge may be much larger with a smaller fraction reserved as equity as unprotected tranche 128. For example, where traditional euro-denominated or cross-currency vehicles might be limited to about $300 million with a 12% equity layer, the offsetting options 102, 104 may permit a vehicle of $1 billion with only an 8% equity layer for unprotected tranches 128.

III. Other Uses

Offsetting option structure 100 may be used to protect funds of a variety of types.

Generally, offsetting options 102, 104 can be used to protect investment vehicles 100 against risks in which derivatives are traded. For example, fixed vs. floating rate risk may be hedged for some tranches, and not for others, by using offsetting interest rate swaps 114 and options 102, 104 (swaptions). Risk of default by issuers of the assets in the investment vehicle may be hedged with call options or credit default swaps.

In some cases, the option(s) 104 sold at the bottom of the structure may differ somewhat from the options 102 purchased at the top of the structure. For example, the options 104 sold may have notional values of somewhat less than, or at a strike price somewhat different than, the options 102 purchased, to retain some protection for investors in the lower unprotected tranches 128 in the difference between the two options.

In some cases, the investment vehicle may have some investors with a "dual currency" redemption claim 130, in which the fund may repay in any of two or more currencies, at its option.

The notional value of the sold option may be the same in amount, or may be the same to within about 2%, 5%, 10%, 20%, 33%, or 50% as the notional value of the purchased option. The notional value of the sold option may be at least 10%, 20%, 30%, 50%, or 67% less than the value of the purchased option.

In some cases, some portion of the management of the fund may be performed within the United States. Cash flows payable by assets into the investment vehicle may be paid into the investment vehicle by issuers in the United States. Cash flows may be paid to United States investors of the various tranches. Other portions of the overall structure may also be made, used, sold, or offered for sale inside the United States, even if other portions are outside the United States. Beneficial use of the system may be obtained by investors or by those operating the system. Customers or investors located within the United States may control transmission of information and may also benefit from exchange of information within the system. Issuers of obligations held within the vehicle may find that they obtain an additional market, or obtain a higher return, from a vehicle using the system.

The investment vehicle may be managed with the assistance of one or more computers. For example, one or more computers may be used to model the transaction while it is being planned, and during its life, to model the flow of funds, to model default scenarios, and the like. Such modeling may be used to manage the assets in the portfolio and to ensure that the transaction supports the credit ratings assigned to the various tranches. In some cases, different parts of the management of the investment fund may be divided among multiple computers connected by local area networks or wide area networks. In some cases, capitalization of the vehicle may be managed dynamically, using the technique described in U.S. patent application Ser. No. 11/146,748 filed Jun. 6, 2005, incorporated herein by reference. Computers may be used to generate statements and reports, to maintain records, etc. for one or more of the steps described above. Access to the software may be provided over local terminals, over the interne on a thin client basis, from a central server array, or through other computer access networks. Some of the transaction documents may be generated by word processing software.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

The invention claimed is:

1. A method, comprising the steps of:
   purchasing an option for protection of cash flows to be paid by an investment vehicle to designated investors, and
   selling an option offsetting the purchased option at least in part;
   structuring the cash flows and security priorities of the investment vehicle so that the purchased option protects the protected investors, and the proceeds of the sale of the sold option offsets the cost of the purchased option for benefit of non-protected investors
   wherein at least one of the steps of purchasing, selling and structuring is performed using a computer by computing data in a non-transitory memory of the computer.

2. The method of claim 1, wherein:
   the investment vehicle is a cross-currency investment vehicle.

3. The method of claim 2, wherein:
   the investment vehicle is a cross-currency investment vehicle investing in fixed income instruments.

4. The method of claim 2, further comprising:
   purchasing a currency swap having size and term to match cash flows generated by assets in the investment vehicle to cash flows to be paid by the vehicle to investors.

5. The method of claim 4, wherein:
the option is a currency swaption having size and term to hedge risk of the asset portfolio of the investment vehicle.

6. The method of claim 5, wherein:
a risk protected by the purchased option is default risk on assets within an investment portfolio of the investment vehicle.

7. The method of claim 5, wherein:
a risk protected by the purchased option is prepayment risk on assets within an investment portfolio of the investment vehicle.

8. The method of claim 2, wherein:
at least some of redemption liabilities of the investment vehicle are payable in two or more currencies.

9. The method of claim 1, wherein:
the non-protected investors include equity holders.

10. The method of claim 1, wherein:
the non-protected investors include income note holders.

11. The method of claim 1, wherein:
a risk protected by the purchased option is default risk on assets within an investment portfolio of the investment vehicle.

12. The method of claim 1, wherein:
a risk protected by the purchased option is prepayment risk on assets within an investment portfolio of the investment vehicle.

13. The method of claim 1, further comprising:
purchasing an interest rate swap having size and term to match cash flows generated by assets in the investment vehicle to cash flows to be paid by the vehicle to investors.

14. The method of claim 13, wherein:
the option is an interest rate swaption having size and term to hedge prepayment risk and/or default risk on assets within an investment portfolio of the investment vehicle.

15. The method of claim 1, wherein:
the purchased option is a basket of a plurality of options.

16. The method of claim 15, wherein:
the options in the basket have exercise dates corresponding to redemption liabilities of the investment vehicle.

17. The method of claim 1, wherein:
the notional value of the sold option is the same in amount, to within about 5%, as the notional value of the purchased option.

18. The method of claim 1, wherein:
the notional value of the sold option is at least 10% less than the value of the purchased option.

19. A method performed by an investor in an investment vehicle, comprising the steps of:
investing in the vehicle and initiating the vehicle to purchase in response to the investment, an option to protect against certain risks of assets owned by the vehicle; initiating the vehicle to sell in response to the purchase of the option, an option corresponding to the purchased option and offsetting the purchased option at least in part; and initiating the calculation in a non-transitory memory of a computer of (1) said options, (2) cash flows and security priorities of the vehicle arranged to protect designated protected investors, and (3) proceeds of the sale of the sold option so that the proceeds offset the cost of the purchased option for benefit of non-protected investors; and
receiving a cash flow from the investment vehicle.

20. The method of claim 19, wherein
the investor is one of the protected investors.

21. The method of claim 19, wherein
the investor is one of the non-protected investors.

22. The method of claim 19, wherein:
the investment vehicle is a cross-currency investment vehicle.

23. The method of claim 22, further comprising:
purchasing a currency swap having size and term to match cash flows generated by the assets to cash flows to be paid by the vehicle to investors.

24. The method of claim 23, wherein:
the option is a currency swaption having size and term to hedge risk on the assets.

25. The method of claim 22, wherein:
at least some of redemption liabilities of the investment vehicle are payable in two or more currencies.

26. The method of claim 19, wherein:
the non-protected investors include equity holders.

27. The method of claim 19, wherein:
the non-protected investors include income note holders.

28. The method of claim 19, wherein:
a risk protected by the purchased option is default.

29. The method of claim 19, wherein:
a risk protected by the purchased option is prepayment.

30. The method of claim 19, further comprising:
purchasing an interest rate swap having size and term to match cash flows generated by the assets to cash flows to be paid by the vehicle to investors.

31. The method of claim 30, wherein:
the option is an interest rate swaption having size and term to hedge risk of the assets against default on the interest rate swap.

32. The method of claim 19, wherein:
the purchased option is a basket of a plurality of options.

33. The method of claim 32, wherein:
the options in the basket have exercise dates corresponding to redemption liabilities of the investment vehicle.

34. The method of claim 19, wherein:
the notional value of the sold option is the same in amount, to within about 10%, as the notional value of the purchased option.

35. The method of claim 19, wherein:
the notional value of the sold option is at least 33% less than the value of the purchased option.

36. A method, comprising the steps of:
computing in a non-transitory memory of a computer data defining an option for protection of cash flows to be paid by an investment vehicle to designated investors,
purchasing an option in accordance with the data computed for the option,
computing in a non-transitory memory of a computer data defining an offsetting option offsetting the purchased option at least in part, and
selling the offsetting option; and
computing in a non-transitory memory of a computer a structure for the cash flows and security priorities of the investment vehicle so that the purchased option protects the protected investors, and the proceeds of the sale of the sold offsetting option offsets the cost of the purchased option for benefit of non-protected investors.

* * * * *